United States Patent [19]
Reeves et al.

(10) Patent No.: US 10,664,509 B1
(45) Date of Patent: May 26, 2020

(54) PROCESSING NON-UNIFORM DATASETS

(71) Applicant: Google LLC, Mountain View, CA (US)

(72) Inventors: Damian Reeves, Menlo Park, CA (US); Rajas Moonka, San Ramon, CA (US); Prajakta Kalekar, Santa Clara, CA (US); Sachin Kulkarni, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 439 days.

(21) Appl. No.: 15/464,840

(22) Filed: Mar. 21, 2017

Related U.S. Application Data

(63) Continuation of application No. 14/019,819, filed on Sep. 6, 2013, now abandoned.

(60) Provisional application No. 61/862,359, filed on Aug. 5, 2013.

(51) Int. Cl.
*G06F 16/338* (2019.01)
*G06F 16/35* (2019.01)
*G06F 16/33* (2019.01)

(52) U.S. Cl.
CPC ........... *G06F 16/35* (2019.01); *G06F 16/334* (2019.01); *G06F 16/338* (2019.01)

(58) Field of Classification Search
CPC ............................... G06Q 10/00; G06Q 40/00
USPC .......................................................... 705/7.33
See application file for complete search history.

(56) References Cited

U.S. PATENT DOCUMENTS

| | | | |
|---|---|---|---|
| 6,446,061 B1 | 9/2002 | Doerre et al. | |
| 8,126,908 B2 | 2/2012 | Vasudevan et al. | |
| 8,346,776 B2 | 1/2013 | Bird et al. | |
| 8,527,893 B2 | 9/2013 | Agrawal | |
| 8,688,504 B2 * | 4/2014 | Reisman ................ | G06Q 30/02 705/7.29 |
| 8,688,710 B2 * | 4/2014 | Vanasco ................. | G06F 21/10 707/748 |

(Continued)

OTHER PUBLICATIONS

Francis "Content Management Systems, remember those?", Mar. 2012, (https://blog.okfn.org/author/francis/). pp. 1-15 (Year: 2012).*

(Continued)

*Primary Examiner* — Romain Jeanty
(74) *Attorney, Agent, or Firm* — Fish & Richardson P.C.

(57) ABSTRACT

Methods, systems, and apparatus, including computer programs encoded on a computer storage medium, for processing non-uniform datasets. In one aspect, a method includes receiving multiple different datasets that have non-uniform labeling conventions and that are not organized in a hierarchical structure, organizing the multiple different datasets that are not organized in a hierarchical structure, into a predefined hierarchical taxonomy, including, analyzing text included in the dataset, assigning the dataset to one or more categories within the predefined hierarchical taxonomy based on the analysis of the textual content and one or more other characteristics of the dataset including a number of identification entries included in the dataset, selecting content for display within the content interface at the user device using one or more of the multiple different datasets that were organized into the predefined hierarchical taxonomy, providing, through the user frontend, the selected content for presentation at the user device.

18 Claims, 7 Drawing Sheets

(56) References Cited

U.S. PATENT DOCUMENTS

| | | | |
|---|---|---|---|
| 8,751,513 B2* | 6/2014 | Priyadarshan | G06F 16/185 707/753 |
| 8,943,054 B2* | 1/2015 | Caruso | G06F 40/205 707/736 |
| 2004/0030603 A1* | 2/2004 | Grundfest | G06Q 10/10 705/26.1 |
| 2008/0262931 A1* | 10/2008 | Chan | G06Q 30/02 705/14.4 |
| 2008/0306913 A1 | 12/2008 | Newman | |
| 2008/0306947 A1 | 12/2008 | Kolesnikov | |
| 2009/0037457 A1 | 2/2009 | Musgrove | |
| 2009/0254422 A1* | 10/2009 | Jenkins | G06Q 10/063 705/7.11 |
| 2010/0293049 A1* | 11/2010 | Maher | G06Q 30/02 705/14.46 |
| 2011/0214080 A1 | 9/2011 | Agrawal et al. | |

OTHER PUBLICATIONS

Spangler et al "Generating and Browsing Multiple Taxonomies Over a Document Collection", Dec. 2003; Journal of Management Information Systems I Spring 2003, vol. 19, No. 4, pp. 191-212.
Sprangleret al "IBM Research Report, Interactive Methods for Taxonomy Editing and Validation", Aug. 2003, Computer Science, pp. 1-42.

* cited by examiner

500

502 — Name: Black Friday & Cyber Monday Shoppers

504 — Description: This category is associated with people who are in in-market for electronics, clothing, shoes & accessories, DVDs & video games, or have looked at coupons online 506 — Device1
Device2
Device3
Device4
...

Name: ~522

| Weight | ID | Name |
|---|---|---|
| 0.5437 | 13441 | /Retailers & General Merchandise/Coupons & Rebates |
| 0.2284 | 13575 | /Retailers & General Merchandise |
| 0.2279 | 13509 | /Occasions & Gifts/Holidays & Seasonal Events |

Description: ~524

| Weight | ID | Name |
|---|---|---|
| 0.4224 | 10176 | /Apparel/Clothing |
| 0.3055 | 10021 | /Apparel |
| 0.2721 | 13779 | /Apparel/Clothing/Women's Clothing |

FIG. 5B

545 ─ Retailers & General Merchandise (3p Data Set 1)            540
    545 ─ Coupons & Rebates (3p Data Set 1)
        Circulars
        ...

Occasions & Gifts
    545 ─ Holidays & Seasonal Events (3p Data Set 1)
        Birthdays
        Graduation
            High School
            College
        Wedding
        ...

545 ─ Apparel (3p Data Set 1)
    545 ─ Clothing (3p Data Set 1)
        545 ─ Women's Clothing (3p Data Set 1)
            Shirts
            ...
        Men's Clothing
        ...
    Accessories
    ...

FIG. 5C

PROCESSING NON-UNIFORM DATASETS

CROSS-REFERENCE TO RELATED APPLICATIONS

This application is a continuation application of, and claims priority to, U.S. patent application Ser. No. 14/019,819, titled "TAXONOMY-BASED ORGANIZATION OF THIRD PARTY AUDIENCE DATA," filed on Sep. 6, 2013, which application claims the benefit under 35 U.S.C. § 119(e) of U.S. Patent Application No. 61/862,359, titled "Taxonomy-Based Organization Of Third Party Audience Data," filed Aug. 5, 2013. The disclosure of the foregoing applications are incorporated herein by reference in their entirety for all purposes.

BACKGROUND

Content publishers may use audience data to determine what types of users may be interested in particular content campaigns. A particular set of audience data may include identification data relating to a group of users who are likely to have an interest in a particular topic, such as golfing. Such audience data may include descriptive data that provides an indication of the topic(s) of likely interest to the audience.

SUMMARY

One implementation of the disclosure relates to a method including receiving, at a computerized content management system, a plurality of third party audience data sets from one or more data providers. Each of the plurality of third party audience data sets includes identification data aggregated by the data provider and relating to one or more groups of users who are likely to have an interest in a topic associated with the respective third party audience data set. Each of the plurality of third party audience data sets includes descriptive data relating to the topic associated with the respective third party audience data set. The descriptive data of each of the plurality of third party audience data sets is non-uniform with descriptive data of at least some others of the plurality of third party audience data sets. The method further includes assigning, using the content management system, each of the plurality of third party audience data sets to one or more categories within a predefined taxonomy. The method further includes receiving, at the content management system, a selection of one or more of the categories within the predefined taxonomy from a content publisher, and identifying, using the content management system, one or more third party audience data sets assigned to the one or more selected categories. The method further includes receiving, at the content management system, a selection of one or more of the identified third party audience data sets to be associated with a content campaign of the content publisher. The content campaign includes one or more content items to be presented to users using the content management system. The method further includes storing, within a memory operably coupled to the content management system, an indication of the association between the one or more selected third party audience data sets and the content campaign, and determining, using the content management system, whether to include the content campaign within a process for displaying content items on one or more devices by comparing one or more characteristics relating to the one or more devices to the one or more selected third party audience data sets associated with the content campaign.

Another implementation of the disclosure relates to a system including at least one computing device operably coupled to at least one memory and configured to receive a plurality of third party audience data sets from one or more data providers. Each of the plurality of third party audience data sets includes identification data aggregated by the data provider and relating to one or more groups of users who are likely to have an interest in a topic associated with the respective third party audience data set. Each of the plurality of third party audience data sets includes descriptive data relating to the topic associated with the respective third party audience data set. The descriptive data of each of the plurality of third party audience data sets is non-uniform with descriptive data of at least some others of the plurality of third party audience data sets. The at least one computing device is further configured to assign each of the plurality of third party audience data sets to one or more categories within a predefined taxonomy. The at least one computing device is further configured to receive a selection of one or more of the categories within the predefined taxonomy from a content publisher and to identify one or more third party audience data sets assigned to the one or more selected categories. The at least one computing device is further configured to receive a selection of one or more of the identified third party audience data sets to be associated with a content campaign of the content publisher. The content campaign includes one or more content items to be presented to users. The at least one computing device is further configured to determine whether to include the content campaign within a process for displaying content items on one or more devices by comparing one or more characteristics relating to the one or more devices to the one or more selected third party audience data sets associated with the content campaign.

Another implementation of the disclosure relates to a computer-readable storage medium having instructions stored thereon that, when executed by a processor, cause the processor to perform operations including receiving a plurality of third party audience data sets from one or more data providers. Each of the plurality of third party audience data sets includes identification data aggregated by the data provider and relating to one or more groups of users who are likely to have an interest in a topic associated with the respective third party audience data set. Each of the plurality of third party audience data sets includes descriptive data relating to the topic associated with the respective third party audience data set. The descriptive data of each of the plurality of third party audience data sets is non-uniform with descriptive data of at least some others of the plurality of third party audience data sets. The operations further include assigning each of the plurality of third party audience data sets to one or more categories within a predefined taxonomy. The operations further include receiving a selection of one or more of the categories within the predefined taxonomy from a content publisher, and identifying one or more third party audience data sets assigned to the one or more selected categories. The operations further include receiving a selection of one or more of the identified third party audience data sets to be associated with a content campaign of the content publisher. The content campaign includes one or more content items to be presented to users. The operations further include storing an indication of the association between the one or more selected third party audience data sets and the content campaign and conducting an auction process to select one or more displayed content items to be displayed on one or more user devices. Conducting the auction process includes including at least one of the one or more content items of the content campaign as a candidate content item for the auction process when the one or more selected third party audience data sets associated with the content campaign indicate a likelihood that one or more users of the one or more user devices will be interested in the at least one content item.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 5A is an illustration of a third party audience data set according to an illustrative implementation.

FIG. 5B is an illustration of suggested taxonomy categories that may result from an analysis of the third party audience data set shown in FIG. 5A according to an illustrative implementation.

FIG. 5C is an illustration of a taxonomy including the categories shown in FIG. 5B according to an illustrative implementation.

DETAILED DESCRIPTION

Figure 1:
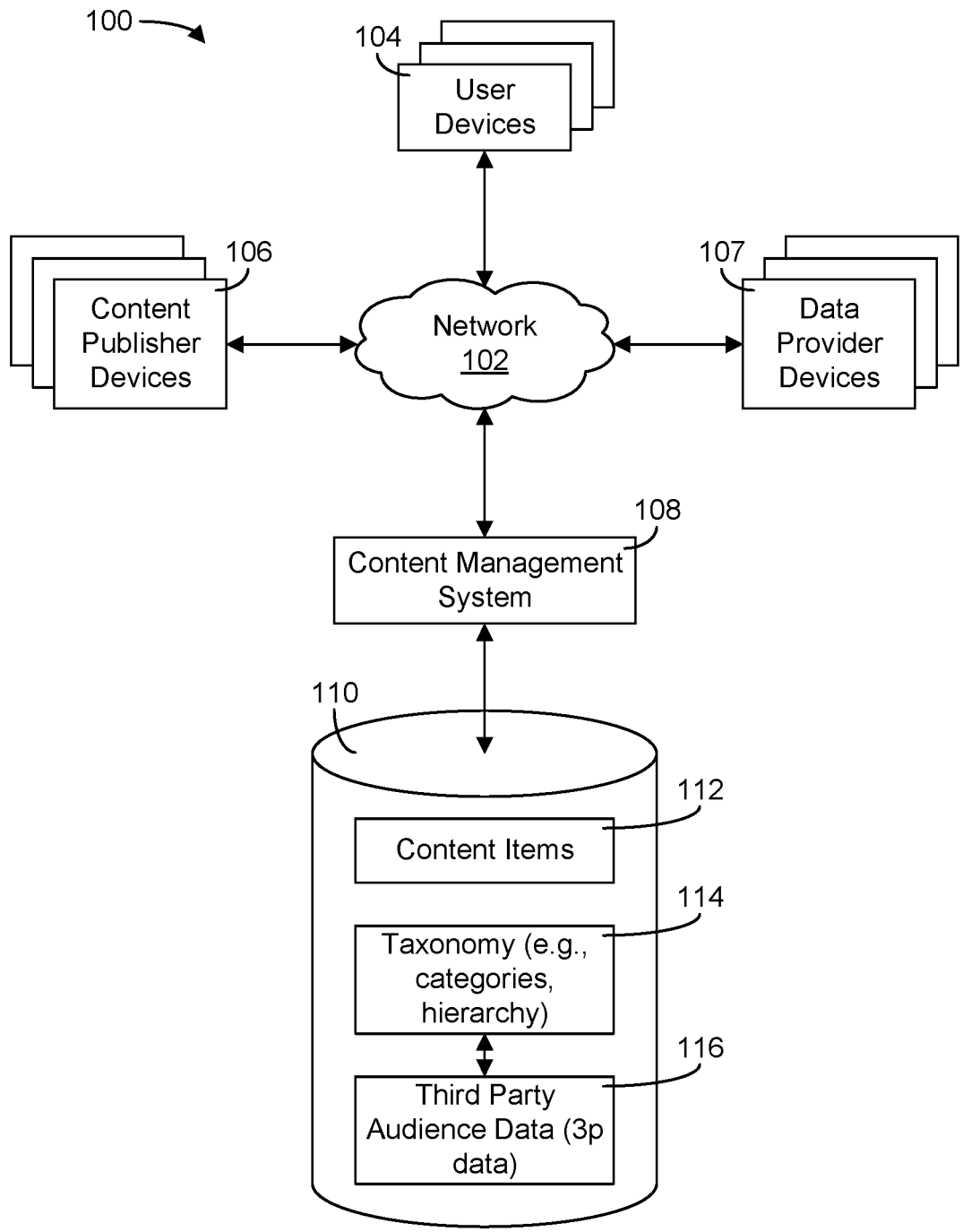
FIG. 1 is a block diagram of a content management system and associated environment according to an illustrative implementation.

Referring generally to the Figures, various illustrative systems and methods are provided that may be used to organize third party audience data to make it more easily discoverable to interested content publishers. Content publishers may include, for example, parties (e.g., advertisers) who wish to publish content within a resource and/or agents acting on behalf of such parties to have content published. Audience data may be used to connect content campaigns (e.g., sets of one or more content items that the content publisher wishes to publish to users within resources, such as web pages or applications) with users who may be interested in the content campaigns. For example, audience data related to an interest in men's clothing may be used by a content publisher to identify groups of user devices on which the content publisher may wish to present content items from a content campaign relating to men's jackets. In some implementations, audience data may include data relating to one or more groups of users who are likely to have an interest in a particular topic. For example, the audience data may include a list of zip codes or other location identifiers where users are likely to be interested in a particular topic, and a location identifier associated with a particular user or user device may be used to determine content to consider displaying to the user device of the user (e.g., through an auction process).

A first type of audience data that may be used by a content publisher may be referred to as first party audience data ("1p data"). 1p data may be collected by the content publisher itself, or a representative or agent of the content publisher, based on previous interactions with user devices. For example, the content publisher may store records relating to previous interactions with a user device or browser (e.g., through a website or other resource associated with the content publisher). The records may include identifying data (e.g., identifying the browser) and data relating to the content of the user interaction (e.g., types of content the user was viewing/interacting with). The content publisher may use the records to determine types of content items that may be of interest to the user, and to identify those content items as items it wishes to display to the users (e.g., within third party resources, such as on another entity's website).

Another type of audience data that may be used to obtain a wider range of user interest information may be referred to as third party audience data ("3p data"). 3p data may be collected/aggregated by a data provider and provided to clients, such as content publishers. In some implementations, the 3p data may be aggregated based on interactions of user devices with various resources (e.g., websites), such as based on topics associated with the resources. The 3p data may include identification data including information relating to groups of users who are likely to be interested in a particular topic. In some implementations, a data provider may provide various lists of 3p data sets that are directed to different topics. Each 3p data set may include information that may be used to determine the subject matter associated with the data set, such as a name and/or description. For example, a fictional 3p data set may have the name "video games" and the description "this category includes people who are in-market for video games and video game systems/accessories."

A problem with 3p data is that 3p data sets are uploaded as flat lists with non-uniform names and descriptions (e.g., such that the names and descriptions are not the same across different data sets and/or different data providers). A client (e.g., a content publisher) manually browses through the names and descriptions to find 3p data sets of interest to the client. A client may have access to 3p data sets from several (e.g., 20) different data providers, many or all of whom may use different labeling conventions for the data (e.g., names and descriptions) associated with their 3p data sets. Additionally, each data provider may offer a very large number of 3p data sets (e.g., 50,000 or more data sets). Because of the flat and non-uniform nature of the 3p data sets, it can be very difficult for a client to identify 3p data sets of interest for the client's content campaigns within the vast amount of possible 3p data sets. As a result, data providers lose potential 3p data set sales to clients that are not able to discover the relevant data sets from the data provider, and clients lose the opportunity to utilize 3p data sets that may be of particular relevance to their content campaigns.

The present disclosure provides a content management system that is configured to arrange 3p data sets within a predefined taxonomy (e.g., a hierarchical taxonomy) to organize the data and make it more easily discoverable to clients, such as content publishers. The data provider may provide one or more 3p data sets to the content management system (e.g., one at a time or via a bulk upload). In some implementations, the data provider may choose one or more categories within the predefined taxonomy to associate with each 3p data set. In some implementations, the content management system may automatically assign the 3p data sets to categories within the taxonomy, or may generate a list of suggested categories for presentation to the data provider, based on the descriptive data (e.g., name and/or description) associated with each 3p data set. If a list of suggested categories is generated, the list may be presented to the data provider, and the data provider may be invited to select categories from the list to associate with the 3p data set. In some implementations, data providers may be allowed to provide suggestions to the content management system for new categories that are not currently in the predefined taxonomy. In some implementations, the content management system may be configured to conduct an approval process for the suggestions (e.g., automatically or manually by a user) to determine whether to include the suggested new categories within the taxonomy. This may help prevent spam, or categorizations that may be of low quality. Once the 3p data sets have been assigned to categories within the taxonomy, clients may be provided an interface through which they may view the available 3p data sets using the taxonomy (e.g., by browsing the taxonomy categories or searching the taxonomy) and choose one or more 3p data sets to associate with content campaigns. In some implementations, the content management system may determine whether to include a content campaign within an auction to display one or more content items on one or more user devices by comparing one or more characteristics relating to the one or more user devices (e.g., a device type) to 3p data associated with the content campaign (e.g., to determine whether the device type appears in the 3p data associated with the content campaign). In some implementations, the content management system may determine whether to display one or more content items of the content campaign without conducting an auction process.

For situations in which the systems discussed here collect personal information about users, or may make use of personal information, the users may be provided with an opportunity to control whether programs or features that may collect personal information (e.g., information about a user's social network, social actions or activities, preferences, location, etc.), or to control whether and/or how to receive content from the content server that may be more relevant to the user. In addition, certain data may be anonymized in one or more ways before it is used or stored, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (e.g., to a city, zip code, or state level), so that a particular location of the user cannot be determined. Thus, the user may have control over how information is collected about him or her and used by a content server.

Referring now to FIG. 1, and in brief overview, a block diagram of a content management system 108 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an internet browser), media files, and/or any other types of content. Content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content publishers via network 102 using one or more content publisher devices 106.

In some implementations, bids for content to be selected by content management system 108 may be provided to content management system 108 from content publishers participating in an auction using devices, such as content publisher devices 106, configured to communicate with content management system 108 through network 102. In such implementations, content management system 108 may determine content to be published in one or more content interfaces of resources (e.g., webpages, applications, etc.) shown on user devices 104 based at least in part on the bids. In some implementations, the bids may include a bid price and a content item or content campaign (e.g., a group of one or more content items that the content publisher wishes to publish to users, such as related content items).

In some implementations, audience data, such as third party audience data ("3p data") 116, may be used by one or more content publishers to help determine groups of user devices to which content items from certain content campaigns should be directed, for example, based on a likelihood that users of the user devices may be interested in topics of the content campaigns. Content management system 108 may receive 3p data 116 from one or more data provider devices 107 via network 102. The content publishers may associate one or more 3p data sets with the content campaigns, and content management system 108 may determine whether to include the content campaigns within an auction based in part on the associated 3p data sets. In some implementations, content management system 108 may determine whether to display one or more content items from the content campaigns on a user device using a process other than an auction process, such as a direct publication process in which the content management system 108 directly publishes content items for a particular cost. Content management system 108 may organize 3p data 116 within a taxonomy 114 including several categories to make 3p data 116 more easily discoverable by content publishers, as described in further detail below.

Referring still to FIG. 1, and in greater detail, user devices 104, content publisher devices 106, and/or data provider devices 107 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104, content publisher devices 106, and/or data provider devices 107 may be designed to use various types of software and/or operating systems. In various illustrative implementations, user devices 104, content publisher devices 106, and/or data provider devices 107 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104, content publisher devices 106, and/or data provider devices 107 may be configured to receive data from various sources using a network 102. In some implementations, network 102 may comprise a computing network (e.g., LAN, WAN, Internet, etc.) to which user devices 104, content publisher devices 106, and/or data provider devices 107 may be connected via any type of network connection (e.g., wired, such as Ethernet, phone line, power line, etc., or wireless, such as WiFi, WiMAX®, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among content publishers to determine which content is to be provided to a user device 104. For example, content management system 108 may conduct a real-time content auction in response to a user device 104 requesting content from a content source (e.g., a website, search engine provider, etc.) or executing an application. Content management system 108 may use any number of factors to determine the winner of the auction. For example, the winner of a content auction may be based in part on the content publisher's bid and/or a quality score for the publisher's content (e.g., a measure of how likely the user of the user device 104 is to click on the content). In other words, the highest bidder is not necessarily the winner of a content auction conducted by content management system 108, in some implementations.

Content management system 108 may be configured to allow content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the publisher is willing to pay in exchange for their content being presented at user devices 104. In some implementations, the bid amount may be on a cost per impression or cost per thousand impressions (CPM) basis. In further implementations, a bid amount may correspond to a specified action being performed in response to the content being presented at a user device 104. For example, a bid amount may be a monetary amount that the content publisher is willing to pay, should their content be clicked on at the client device, thereby redirecting the client device to the publisher's webpage or another resource associated with the content publisher. In other words, a bid amount may be a cost per click (CPC) bid amount. In another example, the bid amount may correspond to an action being performed on the publisher's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a content publisher in a content auction. If the content is to be presented in conjunction with search results from a search engine, for example, the selection parameters may include one or more sets of search keywords. For instance, the content publisher may only participate in content auctions in which a search query for "golf resorts in California" is sent to a search engine. Other example parameters that control when a bid is placed on behalf of a third-party content provider may include, but are not limited to, a topic identified using a device identifier's history data (e.g., based on webpages visited by the device identifier), the topic of a webpage or other content with which the content item selected by the auction is to be presented, a geographic location of the client device that will be presenting the content, or a geographic location specified as part of a search query. In some cases, a selection parameter may designate a specific webpage, website, or group of websites with which the content selected by the auction is to be presented. For example, an advertiser selling golf equipment may specify that they wish to place an advertisement on the sports page of a particular online newspaper.

Content management system 108 may also be configured to suggest a bid amount to a content publisher when a campaign is created or modified. In some implementations, the suggested bid amount may be based on aggregate bid amounts from the content publisher's peers (e.g., other content publishers that use the same or similar selection parameters as part of their campaigns). For example, a content publisher that wishes to place an advertisement on the sports page of an online newspaper may be shown an average bid amount used by other content publishers on the same page. The suggested bid amount may facilitate the creation of bid amounts across different types of client devices, in some cases. In some implementations, the suggested bid amount may be sent to a content publisher as a suggested bid adjustment value. Such an adjustment value may be a suggested modification to an existing bid amount for one type of device, to enter a bid amount for another type of device as part of the same campaign. For example, content management system 108 may suggest that a content publisher increase or decrease their bid amount for desktop devices by a certain percentage, to create a bid amount for mobile devices.

Figure 2:
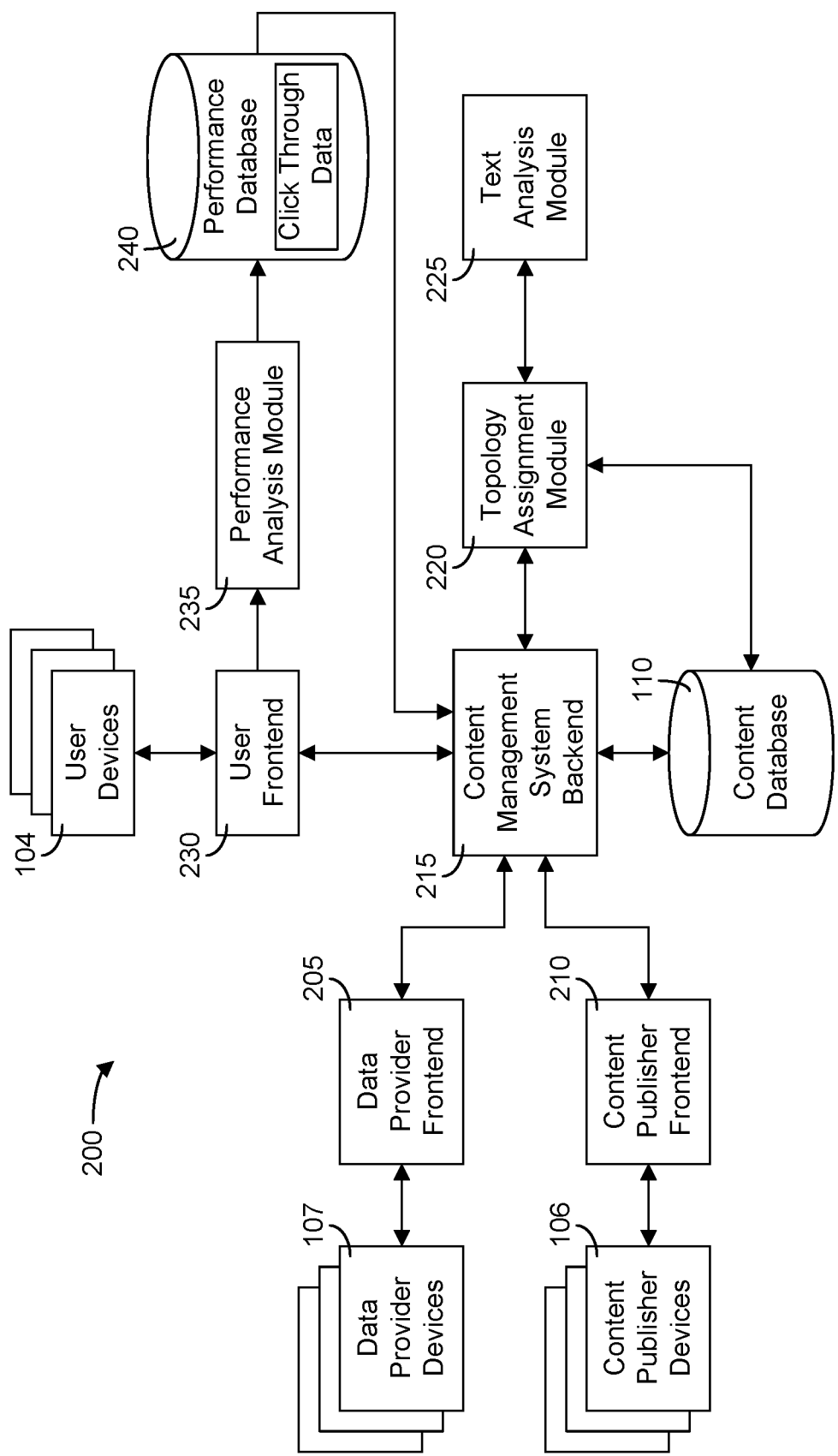
FIG. 2 is a more detailed block diagram of a content management system and associated environment according to an illustrative implementation.

Referring now to FIG. 2, a more detailed block diagram of a content management system 200 and associated environment is shown according to an illustrative implementation. In the illustrated implementation, content management system 200 includes a data provider frontend 205, a content publisher frontend 210, a user frontend 230, a content management system backend 215, and a topology assignment module 220. In some implementations, content management system 200 may include a text analysis module 225, a performance analysis module 235, and a performance database 240. It should be understood that content management system 200, which is a detailed implementation of content management system 108 according to one implementation, is provided for purposes of illustration, and in other implementations, content management system 108 may include additional, fewer, and/or different components. Further, each of the illustrated systems and/or components may be implemented as a separate computing system, multiple systems may be combined within a single hardware system, and/or one or more systems or components may be implemented in a cloud, or distributed computing, environment.

Data provider devices 107 may provide one or more 3p data sets to content management system 300 through data provider frontend 205. Data provider frontend 205 may be an interface through which data providers can provide 3p data sets, modify settings or parameters used by content management system 300, view information about clients utilizing the 3p data sets, etc. In some implementations, data provider frontend 205 may be or include a web-based user interface. In some implementations, data provider frontend 205 may include a custom API specific to a particular data provider. In some implementations, data provider frontend 205 may allow data providers to upload 3p data sets individually and/or in batches.

Each of the 3p data sets may include identification data including information relating to groups of users likely to have an interest in a topic associated with the 3p data set. In some implementations, the identification data may include web browser identifiers that identify particular browser (e.g., browser cookies). In some implementations, the identification data may include device identifiers that may be used to identify one or more user devices. In some implementations, the identification data may include data that can be used to identify a group or category of user devices 104 for users likely to have an interest in a topic. For example, the identification data may include location identifiers (e.g., city, state, zip code, area code, etc.) that identify locations in which users are likely to have an interest in the topic. Users may be given the ability to control what types of identification data relating to the users is received and/or may be given the ability to clear or reset identification data (e.g., clear or disable browser cookies).

In some implementations, a data provider may aggregate 3p identification data from several different sources. For example, a data provider may receive identification data from several different website operators and combine the identification data into one or more 3p data files. In some implementations, a data provider may receive identification data from several web sites whose subject matter is based around a common topic, such as electronic gadget information, and aggregate the identification data into a single 3p data set with a topic related to electronic gadget information. In some implementations, the data provider may receive contextual information with the identification data (e.g., a web page or subject matter being viewed on a user device associated with the identification data) and use the contextual information to infer one or more topics of interest. In some implementations, the identification information may be included within more than one 3p data set by the data provider.

Each of the 3p data sets may also include descriptive data relating to the topic of interest associated with the 3p data set. For example, in some implementations, each list may include a name and a description intended to help clients, such as content publishers, determine the topic of interest associated with the lists. One example 3p data set may include the name "Department Store Shoppers" and the description "Individuals who have indicated an interest in clothing, accessories, home goods, and/or other items typically sold in department stores." The description data included within the 3p data sets may be non-uniform (e.g., similar topics of interest may be described differently in description data from different data providers) and/or flat (e.g., may not be organized within a hierarchical structure).

Data provider frontend 205 may provide the 3p data sets to content management system backend 215, which may organize the 3p data sets within a predefined taxonomy that includes multiple categories. Content management system backend 215 may assign each 3p data set to one or more categories within the predefined taxonomy using a variety of different methods, as described in detail below, for example, with respect to FIGS. 3 and 4. In some implementations, content management system backend 215 may utilize a topology assignment module 220 configured to receive the 3p data sets, including the description data, and automatically assign the 3p data sets to one or more categories, or provide a list of suggested categories based on an automated analysis of the description data. In some implementations, topology assignment module 220 may communicate with a separate text analysis module 225 configured to receive text (e.g., part or all of the description data) and generate one or more recommended terms (e.g., categories) relevant to the input text based on an automated analysis of the input text. In some implementations, text analysis module 225 may be (or be a part of) an automated analysis module that is also used for other functions of content management system 200 or another auction or content management system, such as a module used to determine relevant content campaigns to include within an auction based on input terms or phrases. The predefined taxonomy, 3p data sets, and/or indications of the assignments of the 3p data sets to categories within the taxonomy may be stored within content database 110 or another machine-readable storage medium to which content management system backend 215 has access.

Content providers may use content publisher devices 106 to submit bids and/or to choose 3p data sets to associate with one or more content campaigns through content publisher frontend 210. Content publisher frontend 210 may provide an interface through which content providers can view and/or otherwise discover 3p data sets using the predefined taxonomy. For example, in some implementations, the interface may allow content publishers to browse through the taxonomy (e.g., browse a graphical representation of a list, such as a hierarchical list, of categories) and identify 3p data sets associated with particular categories. In some implementations, the interface may allow content publishers to search the taxonomy categories for particular terms and view representations of 3p data sets assigned to categories provided within search results. In various implementations, various other interface types and/or features may be provided by content publisher frontend 210.

Content publisher devices 106 may submit a selection of one or more 3p data sets to be associated with one or more content campaigns of the content publisher to content publisher frontend 210, which may in turn transmit the selection to content management system backend 215. Content management system backend 215 may store an indication of the association between the content campaigns and the 3p data sets in content database 110 or another machine-readable storage medium to which content management system backend 215 has access.

When a particular user device of user devices 104 accesses a resource (e.g., a webpage) in which a content interface is provided, an indication may be provided to a user frontend 230. User frontend 230 may notify content management system backend 215, and content management system backend 215 may conduct an auction or other content selection process to determine one or more content items to be presented to the user within the content interface. In some implementations, content management system backend 215 may determine whether to include a content campaign within the content selection process based in part on a comparison of a characteristic of the user device (e.g., a current geographic region of the user device or device type of the user device) to one or more 3p data sets associated with the content campaign. For example, if a characteristic of the user device matches identification data of a 3p data set for the campaign, the campaign may be included in an auction. Content management system backend 215 may select one or more content items for display within a content interface on the user device. For example, content management system backend 215 may select one or more winning bids using an auction process, and the content items associated with the winning bids may be presented on the user device via user frontend 230.

In some implementations, data representing interactions of the user with the displayed content items on the user device may be transmitted back to user frontend 230 and may be transmitted to a performance analysis module 235 (e.g., a click server). Performance analysis module 235 may store data relating to the displayed content items and/or content interface and the resultant interaction of the user (e.g., click through data) within a performance database 240.

In some implementations, content management system 108 may enforce a limit (e.g., minimum or maximum threshold) on the number of categories to which a particular 3p data set may be assigned. For example, content management system 108 may allow a particular 3p data set to be assigned to no more than six categories. This may help prevent against a data provider assigning a data set to many categories, potentially including categories with which the data set has little or no relation, in an effort to increase the exposure of the data set, which reduces the usefulness of the taxonomy for content publishers.

Figure 3:
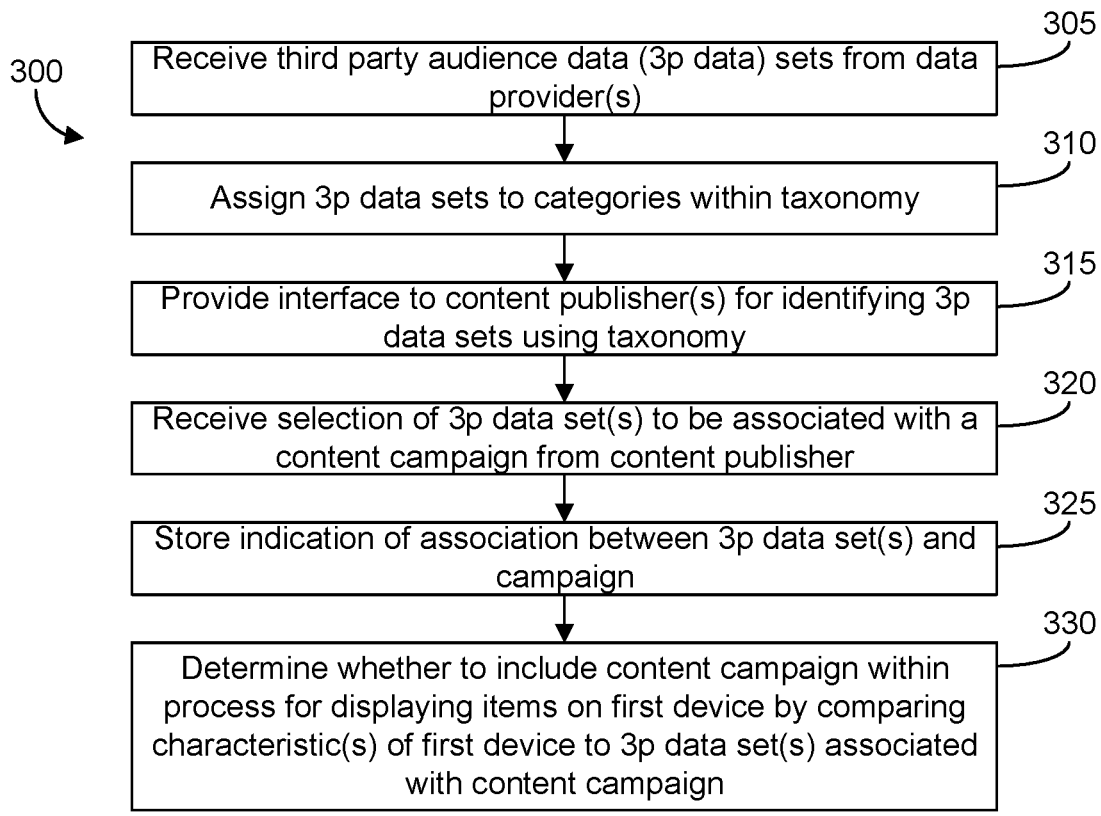
FIG. 3 is a flow diagram of a process for assigning third party audience data to a taxonomy and using the third party audience data in conducting a content selection process according to an illustrative implementation.

FIG. 3 illustrates a flow diagram of a process 300 for assigning third party audience data to a taxonomy and using the third party audience data in conducting a content selection process (e.g., auction process) according to an illustrative implementation. Referring to both FIGS. 1 and 3, content management system 108 may receive 3p data sets from one or more data providers (305). The 3p data sets may each include identification data including information relating to one or more groups of users interested in a particular topic, and description data (e.g., name and/or description) that may be used to determine a topic of interest associated with the 3p data.

Content management system 108 may assign each of the 3p data sets to one or more categories within the predefined taxonomy (310). The 3p data sets may be assigned to categories based on a number of different characteristics of the 3p data sets. For example, in some implementations, the 3p data sets may be assigned to categories based on a topic of interest associated with the 3p data sets (e.g., based on the description data of the 3p data sets). In some implementations, the 3p data sets may be assigned to categories based on a number of identification data entries included within the 3p data sets. For example, a 3p data set including 500 pieces of identification data may be assigned to a different category (e.g., a category for 3p data sets including 1,000 or less device identifiers) than a 3p data set including 11,000 pieces of identification data (e.g., a category for 3p data sets including more than 10,000 pieces of identification data). In various other implementations, the 3p data sets may be assigned to categories based on various other characteristics of the 3p data sets.

Content management system 108 may assign the 3p data sets to categories in one or more of a variety of ways. In some implementations, content management system 108 may present the taxonomy categories to a data provider and allow the data provider to select categories to which a particular 3p data set should be assigned. In some implementations, the interface may allow the data provider to browse a textual or graphical representation of the taxonomy and select categories within the representation to which the 3p data set is to be assigned. In some implementations, the interface may allow the data provider to search the categories of the taxonomy (e.g., based on a search string), and may provide results indicating the categories determined to be most relevant to the search, at which point the data provider may select one or more of the categories to which the 3p data set is to be assigned. An indication of the assignment from the data provider may be stored in a memory.

In some implementations, content management system 108 may determine one or more categories to which a 3p data set should be assigned using an automated analysis of characteristics of the 3p data set (e.g., without human interaction). In some implementations, content management system 108 may conduct an automated textual analysis on part or all of the description data of a 3p data set to determine categories to which the 3p data set should be assigned. The automated analysis may take one or more terms or phrases from the description data as input and identify one or more categories that are identified as being most closely related to the input based on the analysis. For example, a category may be identified by the automated analysis if it includes terms or phrases that are found within the description data of the 3p data set or are closely related to terms or phrases found within the 3p data set. In some implementations, content management system 108 may be configured to calculate a weighting value associated with each of the output categories that provides a quantitative measure of the similarity between the description data and the identified category. In various implementations, if the description data includes more than one data portion (e.g., name and description), the description data may be concatenated and the analysis may be performed on the concatenated input, the separate portions may be processed separately, and results for each portion may be provided, one portion may be weighted more heavily and the results may be comingled based upon the weighting, etc. In some implementations, content management system 108 may automatically assign the 3p data set to one or more top categories identified using the automated analysis (e.g., without further human interaction, such as with the data provider).

In some implementations, suggested categories may be provided to the data provider based upon the results of the analysis, and the data provider may be allowed to select one or more of the suggested categories (or other categories) to which the 3p data set should be assigned. In some implementations, the data provider may be provided with the weighting values along with the suggested categories to give the data provider a quantitative indication of the strength of the suggestion. The data provider may select one or more categories, and content management system 108 may store an indication of the assigned categories in content database 110.

In some implementations, content management system 108 may allow data providers to suggest modifications to the predefined taxonomy. For example, a data provider may suggest that a new category be added to the taxonomy and that a 3p data set being uploaded be assigned to the new suggested category. In some implementations, content management system 108 may mark the newly suggested category using a different classifier (e.g., "suggested") than the preexisting categories in the taxonomy (e.g., "approved"). The newly suggested category may be placed through an approval process (e.g., automated or subject to manual review) before the category is incorporated into the taxonomy. In some implementations, only those categories with approval classifications may be made visible to content publishers. In some implementations, content management system 108 may allow data providers to download a file including the predefined taxonomy (e.g., listing all of the categories, such as in a spreadsheet or comma separated value (csv) file), edit the file, and bulk upload any suggested category changes. In some implementations, content management system 108 may allow for offline and/or real-time or near real-time updating of categories. In some implementations, data providers may additionally or alternatively be allowed to suggest modifications to categories or removal of categories. In some implementations, the predefined taxonomy may be maintained (e.g., periodically or at certain upgrade points) to add, modify, and/or remove categories, and content management system 108 may be configured to process existing 3p data sets to identify new or changed categories that may be relevant to the 3p data sets. In some implementations, the data provider interface may allow the data provider to view the categories to which a 3p data set is assigned and/or view the 3p data sets assigned to a particular category. In some implementations, the data may be presented to the data provider in the form of a hierarchical structure.

Content management system 108 may be configured to provide an interface to content publishers that may be used to identify 3p data sets using the taxonomy assignments (315). Representations of the taxonomy, 3p data sets, and/or the assignments of the 3p data sets to categories within the taxonomy may be presented to the content publishers in one or more of a variety of ways. For example, a content publisher may be provided with a hierarchical representation of the taxonomy (e.g., the catagories organized within a hierarchy), and the representation may include indications of 3p data sets associated with the various categories. In some implementations, a content publisher may be shown a list of 3p data sets along with categories to which each of the 3p data sets is assigned. In some implementations, content management system 108 may be configured to receive a search string (e.g., one or more terms) from a content publisher, perform a textual analysis to determine one or more categories relevant to the search string, and return a representation of the one or more categories to the content publisher along with an indication of the 3p data sets assigned to each category. In various implementations, other ways of representing the data to the user may be utilized by content management system 108. Content management system 108 may subsequently receive a selection of one or more 3p data sets that the content publisher wishes to associate with one or more content campaigns (320).

Figure 4:
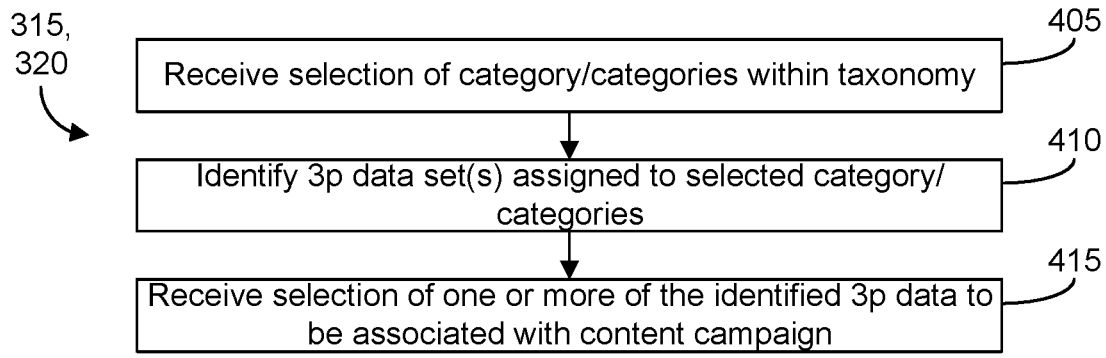
FIG. 4 is a flow diagram of a process for providing a content publisher with an interface for identifying and selecting third party audience data sets using a taxonomy according to an illustrative implementation.

FIG. 4 is a flow diagram of a process that may be used to implement operations 315 and 320 of process 300 according to an illustrative implementation. Content management system 108 may receive a selection of one or more categories within the taxonomy (405). In some implementations, the content provider may select the categories within a visual representation of part or all of the taxonomy (e.g., a hierarchical view). In some implementations, the content provider may select the categories using a search interface or other method used to identify the categories most likely to be relevant to the content campaign(s).

Content management system 108 may be configured to identify one or more 3p data sets that are assigned to the selected category or categories and present a representation of the identified 3p data sets to the content publisher (410). In some implementations, the 3p data sets may be presented to the publisher along with the descriptive data, so that the publisher can further determine whether the 3p data sets are data sets that the publisher wishes to associate with a content campaign. Content management system 108 may subsequently receive a selection of one or more of the identified 3p data sets to be associated with one or more content campaigns of the publisher (415). An indication of the selection may be stored in a memory.

Referring again to FIGS. 1 and 3, an indication of the association between the 3p data set(s) and content campaign(s) may be stored in a memory (325). The indication of the association may be stored in a relational database or other data storage structure configured to represent the association in a way that can be later utilized by content management system 108 when conducting content selection processes.

Upon receiving a request to provide content items to present on one or more user devices, content management system 108 may determine whether to include a content campaign within a content selection process, such as an auction process, to determine the content items to present on the user device by comparing one or more characteristics relating to the one or more devices to one or more 3p data sets associated with the content campaign (330). For example, content management system 108 may determine if a browser identifier of a browser running on the user device appears in any of the 3p data sets associated with the content campaign, and, if so, may include one or more content items from the content campaign as candidate content items within an auction. In another example, content management system 108 may determine if a location identifier of the user device (e.g., GPS location, cellular tower location, etc.) matches a location in a 3p data set associated with the campaign (e.g., a zip code) in which users are likely to be interested in the topic of the campaign. In some implementations, instead of or in addition to determining whether to include a content campaign within the auction, the 3p data may be used to determine one or more parameters of the campaign and/or the auction bid. For example, a campaign may specify that a first bid value should be offered if the device identifier does not match identifiers in the 3p data sets associated with the campaign, and a second bid value (e.g., a higher bid value) should be offered if the device identifier does appear in the 3p data sets, which may indicate that the user of the device is more likely to be interested in the content campaign.

Figure 5D:
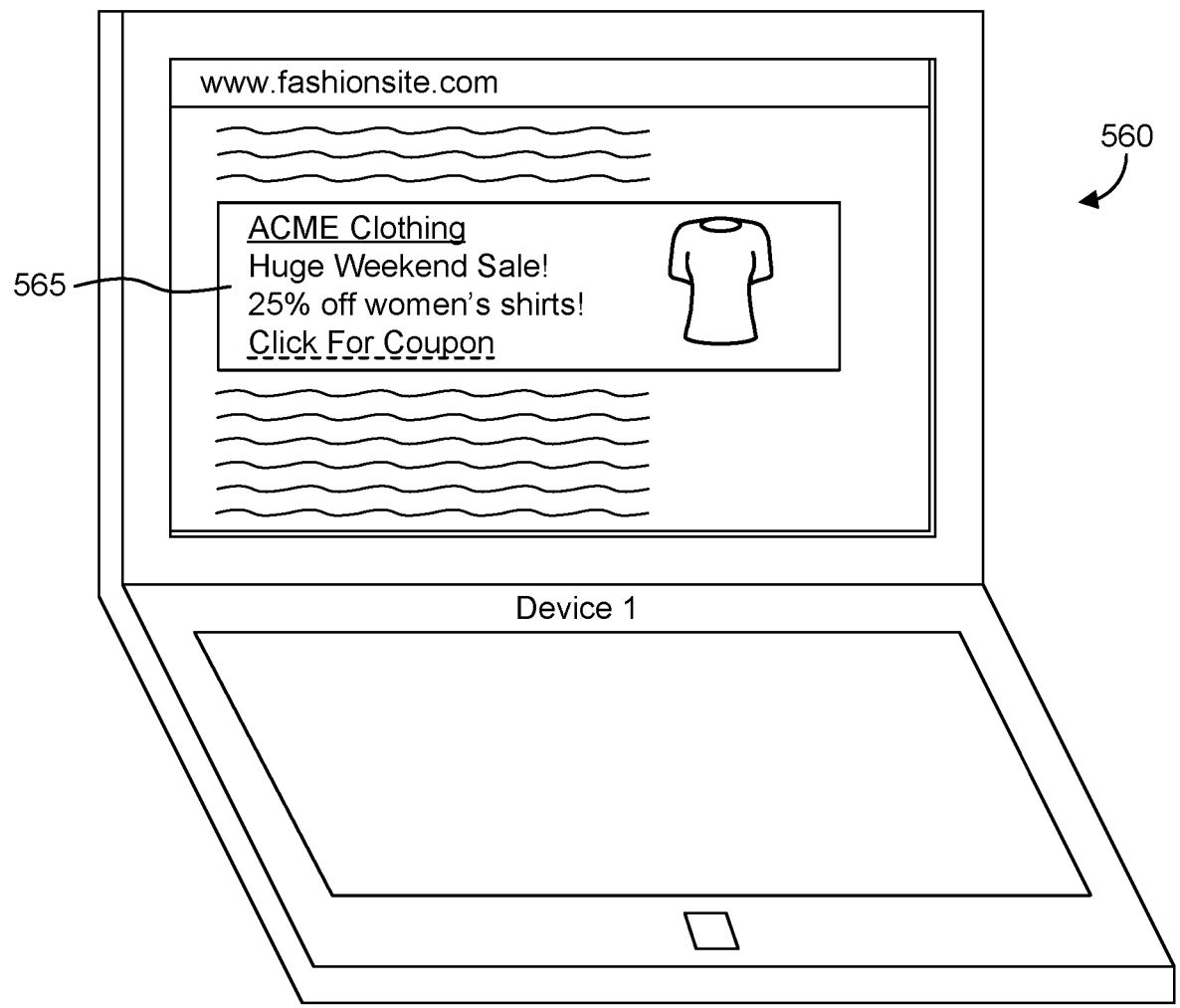
FIG. 5D is an illustration of a user device having displayed thereon a display image including a content item selected in part based on the third party audience data shown in FIG. 5A according to an illustrative implementation.

FIGS. 5A through 5D illustrate how 3p data sets may be organized within a taxonomy by content management system 108 and used in conducting content selection processes according to illustrative implementations. FIG. 5A illustrates a 3p data set 500. 3p data set 500 includes a name 502, a description 504, and an identifier list 506. Name 502 of 3p data set 500 is "Black Friday & Cyber Monday Shoppers," and description 504 states that "[t]his category is associated with people who are in-market for electronics, clothing, shoes & accessories, DVDs & video games, or have looked at coupons online." Identifier list 506 includes device/browser identifiers (e.g., cookies) for devices associated with the topic of 3p data set 500, including a device Device1.

FIG. 5B illustrates suggested taxonomy categories 520 that may result from an analysis (e.g., automated analysis) of name 502 and description 504 of 3p data set 500. Name results 522 include suggestions that may result from an analysis of name 502. In the illustrated implementation, each result includes a name of the suggested category, a unique identifier of the category within the taxonomy, and a weight value quantifying the estimated relevance of the category to 3p data set 500 based on the analysis of name 502. Description results 524 provide similar suggestions based on description 504. In the illustrated implementation, name results 522 and description results 524 may be presented separately. In some implementations, the results may be comingled with one another, such as based on the weight values. For example, the results could be presented in descending order of weight value, with the first result of name results 522 being presented first, followed by all three results of description results 524, and then followed by the final two results of name results 522. Various other ways of presenting the suggestions may be utilized in other illustrative implementations.

FIG. 5C illustrates a taxonomy 540 including the suggested categories included in FIG. 5B. Taxonomy 540 is a hierarchical taxonomy having multiple levels of categories. Subcategories, or categories in a lower level, under a certain category may be contextually related to one another. For example, a main category "Occasions and Gifts" may include the subcategories "Holidays & Seasonal Events," "Birthdays," "Graduation," and "Wedding." Taxonomy 540 includes categories 545 to which 3p data set 500 has been assigned. In some implementations, taxonomy 540 may include an indication of the categories to which 3p data set 500 is assigned and/or the 3p data sets assigned to each category in taxonomy 540.

FIG. 5D illustrates a user device 560 that has a display on which an image is displayed. The display image may be a website on which a content item 565 is displayed and that may relate to fashion. Content item 565 may be a content item included within a campaign with which 3p data set 500 is associated. An auction used to select content item 565 may include the content campaign within the auction, because the device/browser identifier for user device 560 is Device1, and the device/browser identifier Device1 appears in identifier list 506 of 3p data set 500. In the illustrated implementation, content item 565 has won the auction and has been displayed to the user.

Figure 6:
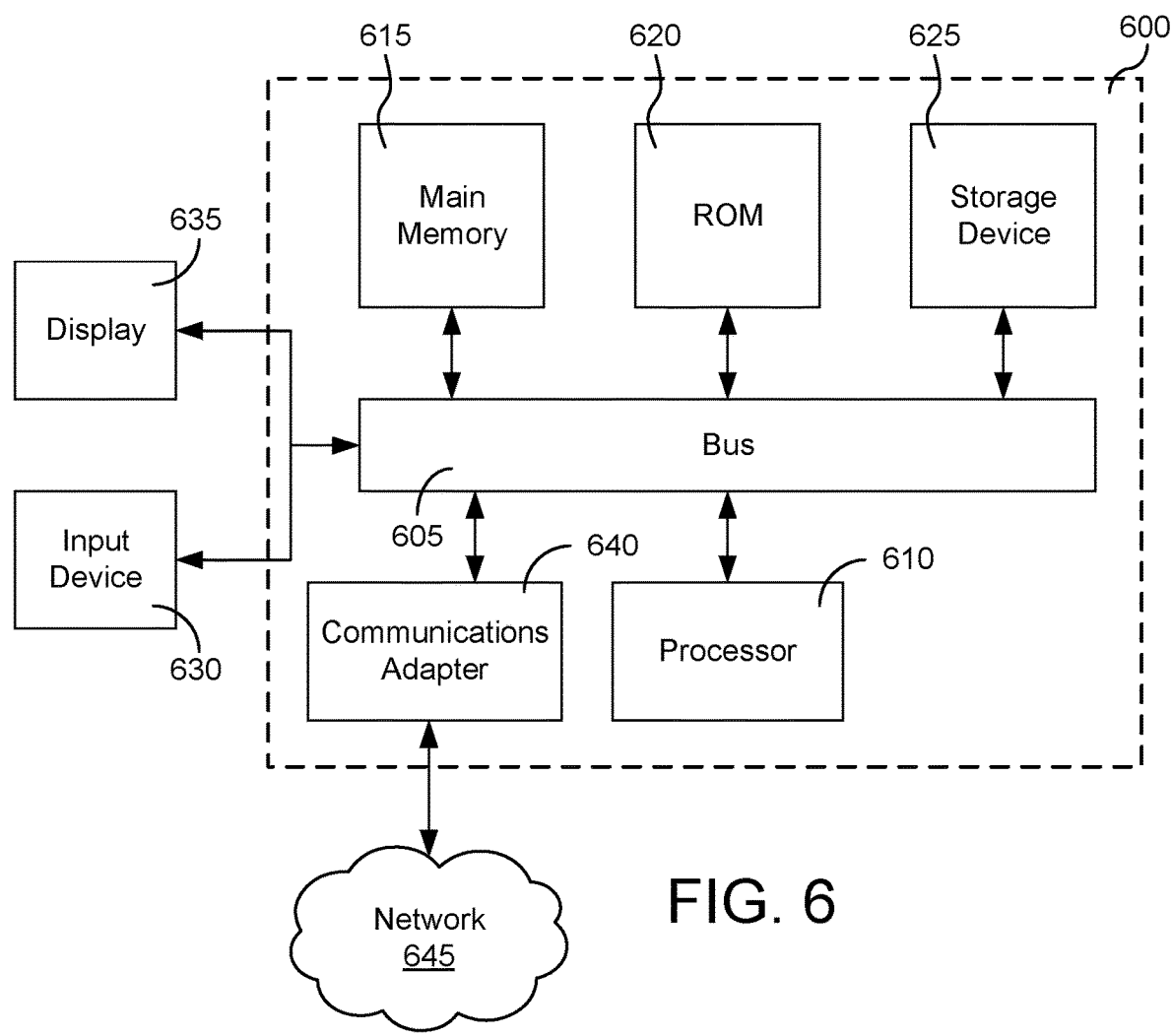
FIG. 6 is a block diagram of a computing system according to an illustrative implementation.

FIG. 6 illustrates a depiction of a computer system 600 that can be used, for example, to implement an illustrative user device 104, an illustrative content management system 108, an illustrative content publisher device 106, an illustrative data provider device 107, and/or various other illustrative systems (e.g., components illustrated in FIGS. 1 and 2) that may be used in the implementation of an environment in which online content may be provided as described in the present disclosure. The computing system 600 includes a bus 605 or other communication component for communicating information and a processor 610 coupled to the bus 605 for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

In some implementations, the computing system 600 may include a communications adapter 640, such as a networking adapter. Communications adapter 640 may be coupled to bus 605 and may be configured to enable communications with a computing or communications network 645 and/or other computing systems. In various illustrative implementations, any type of networking configuration may be achieved using communications adapter 640, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-Ray® or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix®, Vudu®, Hulu®, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a data provider frontend, including one or more processors, that performs operations including receiving, from multiple different data providers, multiple different datasets that have non-uniform labeling conventions and that are not organized in a hierarchical structure;
    a content management system backend, including one or more processors, that is in communication with the data provider frontend and performs operations including organizing the multiple different datasets that are not organized in a hierarchical structure, into a predefined hierarchical taxonomy;
    a text analysis module, including one or more processors, that performs operations including analyzing, for each dataset from the multiple different datasets, text included in the dataset;
    a topology assignment module, including one or more processors, that performs operations including assigning, for each dataset from the multiple different datasets, the dataset to one or more categories within the predefined hierarchical taxonomy based on the text analysis of the text and one or more other characteristics of the dataset including a number of identification entries included in the dataset;
    a user frontend that is in communication with the content management system backend and performs operations including receiving an indication that a user device is accessing a resource in which a content interface is provided;
    the content management system backend performing operations including selecting, in response to receiving the indication, content for display within the content interface at the user device using one or more of the multiple different datasets that were organized into the predefined hierarchical taxonomy; and
    a user frontend, including one or more processors, that performs operations including providing the selected content for presentation at the user device.

2. The system of claim 1, wherein assigning the dataset to one or more categories comprises assigning the dataset to no more than a threshold number of categories to maintain usefulness of the predefined hierarchical taxonomy.

3. The system of claim 1, wherein selecting content for display comprises:
    comparing a characteristic of the user device to one or more of the multiple different datasets that were organized into the predefined hierarchical taxonomy;
    determining that the characteristic of the user device appears in a given dataset from the multiple different datasets; and
    including content associated with the given dataset in a selection process used to select content for display.

4. The system of claim 3, wherein the characteristic is a browser identifier of a browser running on the user device.

5. The system of claim 1, wherein the content management system backend performs operations including providing a graphical representation of the predefined hierarchical taxonomy that includes indications of the assignments of the multiple different datasets to various categories.

6. The system of claim 1, wherein the content management system backend performs operations including:
    receiving a query including one or more terms;
    performing a textual analysis to determine one or more categories relevant to a search string; and
    returning, in response to a query, a representation of the one or more categories along with an indication of datasets from the multiple different datasets that are assigned to each of the one or more categories.

7. A method comprising:
receiving, through a data provider frontend interface including one or more processors and from multiple different data providers, multiple different datasets that have non-uniform labeling conventions and that are not organized in a hierarchical structure;
organizing, by a content management system backend that is in communication with a data provider frontend, the multiple different datasets that are not organized in a hierarchical structure, into a predefined hierarchical taxonomy, including, for each dataset from the multiple different datasets:
analyzing, by a text analysis module including one or more processors, text included in the dataset;
assigning, by a topology assignment module including one or more processors, the dataset to one or more categories within the predefined hierarchical taxonomy based on the analysis of the text and one or more other characteristics of the dataset including a number of identification entries included in the dataset;
receiving, through a user frontend that is in communication with the content management system backend, an indication that a user device is accessing a resource in which a content interface is provided;
selecting, by the content management system backend in response to receiving the indication, content for display within the content interface at the user device using one or more of the multiple different datasets that were organized into the predefined hierarchical taxonomy; and
providing, through the user frontend, the selected content for presentation at the user device, wherein the content management system includes one or more processors.

8. The method of claim 7, wherein assigning the dataset to one or more categories comprises assigning the dataset to no more than a threshold number of categories to maintain usefulness of the predefined hierarchical taxonomy.

9. The method of claim 7, wherein selecting content for display comprises:
comparing a characteristic of the user device to one or more of the multiple different datasets that were organized into the predefined hierarchical taxonomy;
determining that the characteristic of the user device appears in a given dataset from the multiple different datasets; and
including content associated with the given dataset in a selection process used to select content for display.

10. The method of claim 9, wherein the characteristic is a browser identifier of a browser running on the user device.

11. The method of claim 7, comprising providing a graphical representation of the predefined hierarchical taxonomy that includes indications of the assignments of the multiple different datasets to various categories.

12. The method of claim 7, comprising:
receiving, by the content management system backend, a query including one or more terms;
performing a textual analysis to determine one or more categories relevant to a search string; and
returning, in response to a search query, a representation of the one or more categories along with an indication of datasets from the multiple different datasets that are assigned to each of the one or more categories.

13. A non-transitory computer-readable storage medium having instructions stored thereon that, when executed by one or more processors, cause the one or more processors to perform operations comprising:
receiving, from multiple different data providers, multiple different datasets that have non-uniform labeling conventions and that are not organized in a hierarchical structure;
organizing the multiple different datasets that are not organized in a hierarchical structure, into a predefined hierarchical taxonomy, including, for each dataset from the multiple different datasets:
analyzing text included in the dataset;
assigning the dataset to one or more categories within the predefined hierarchical taxonomy based on the analysis of the text and one or more other characteristics of the dataset including a number of identification entries included in the dataset;
receiving an indication that a user device is accessing a resource in which a content interface is provided;
selecting, in response to receiving the indication, content for display within the content interface at the user device using one or more of the multiple different datasets that were organized into the predefined hierarchical taxonomy; and
providing the selected content for presentation at the user device.

14. The non-transitory computer-readable storage medium of claim 13, wherein assigning the dataset to one or more categories comprises assigning the dataset to no more than a threshold number of categories to maintain usefulness of the predefined hierarchical taxonomy.

15. The non-transitory computer-readable storage medium of claim 13, wherein selecting content for display comprises:
comparing a characteristic of the user device to one or more of the multiple different datasets that were organized into the predefined hierarchical taxonomy;
determining that the characteristic of the user device appears in a given dataset from the multiple different datasets; and
including content associated with the given dataset in a selection process used to select content for display.

16. The non-transitory computer-readable storage medium of claim 15, wherein the characteristic is a browser identifier of a browser running on the user device.

17. The non-transitory computer-readable storage medium of claim 13, wherein the instructions cause the one or more processors to perform operations comprising providing a graphical representation of the predefined hierarchical taxonomy that includes indications of the assignments of the multiple different datasets to various categories.

18. The non-transitory computer-readable storage medium of claim 13, wherein the instructions cause the one or more processors to perform operations comprising:
receiving a query including one or more terms;
performing a textual analysis to determine one or more categories relevant to a search string; and
returning, in response to a search query, a representation of the one or more categories along with an indication of datasets from the multiple different datasets that are assigned to each of the one or more categories.

* * * * *

UNITED STATES PATENT AND TRADEMARK OFFICE
CERTIFICATE OF CORRECTION

| | | |
|---|---|---|
| PATENT NO. | : 10,664,509 B1 | Page 1 of 1 |
| APPLICATION NO. | : 15/464840 | |
| DATED | : May 26, 2020 | |
| INVENTOR(S) | : Reeves et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this
Twenty-fourth Day of January, 2023

Katherine Kelly Vidal
*Director of the United States Patent and Trademark Office*